US009525685B2

(12) United States Patent
Grigg et al.

(10) Patent No.: US 9,525,685 B2
(45) Date of Patent: *Dec. 20, 2016

(54) USER AUTHENTICATION BASED ON OTHER APPLICATIONS

(71) Applicant: BANK OF AMERICA CORPORATION, Charlotte, NC (US)

(72) Inventors: David M. Grigg, Rock Hill, SC (US); Peter John Bertanzetti, Charlotte, NC (US); Charles Jason Burrell, Middleburg, FL (US); Carrie Anne Hanson, Charlotte, NC (US); Joseph Neil Johansen, Rock Hill, SC (US); Michael E. Toth, Charlotte, NC (US); Elizabeth S. Votaw, Potomac, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,974

(22) Filed: Dec. 28, 2015

(65) Prior Publication Data
US 2016/0134614 A1  May 12, 2016

Related U.S. Application Data

(63) Continuation of application No. 14/175,863, filed on Feb. 7, 2014, now Pat. No. 9,223,951.

(51) Int. Cl.
*G06F 7/04* (2006.01)
*G06F 15/16* (2006.01)
(Continued)

(52) U.S. Cl.
CPC .............. *H04L 63/083* (2013.01); *G06F 21/31* (2013.01); *G06F 21/41* (2013.01); *H04L 63/04* (2013.01); *H04L 63/08* (2013.01); *H04L 63/10* (2013.01)

(58) Field of Classification Search
CPC ....................................................... G06F 21/31
(Continued)

(56) References Cited

U.S. PATENT DOCUMENTS 3,256,670 A  6/1966  Tersigni
3,261,093 A  7/1966  Reswick
(Continued)

FOREIGN PATENT DOCUMENTS

EP  1132876 A2  9/2001
WO  2012058099 A1  5/2012
WO  2013095486 A1  6/2013

OTHER PUBLICATIONS

DThru.com. "QThru: use your mobile smartphone for self-checkout" http://www.qthru.comi. QThru.com 2011. 6 pages. Retrieved Mar. 22, 2013.

(Continued)

*Primary Examiner* — Morshed Mehedi
*Assistant Examiner* — Khalil Naghdali
(74) *Attorney, Agent, or Firm* — Michael A. Springs; Moore & Van Allen PLLC; W. Kevin Ransom

(57) ABSTRACT

The present invention includes a system for authenticating a second action based on a first action, wherein the system is configured to: receive a first request to execute a first action associated with a first application; determine that execution of the first action requires user authentication; request one or more authentication credentials from the user; receive a first authentication credential associated with the first action; validate the first authentication credential, thereby resulting in a successful validation of the received first authentication credential; in response to the successful validation, execute (Continued)

the first action; receive a second request to execute a second action associated with a second application; determine that execution of the second action requires user authentication; use the successful validation of the first authentication credential to validate a second authentication credential so that the second action may be executed.

15 Claims, 5 Drawing Sheets

(51) Int. Cl.
  *G06F 17/30* (2006.01)
  *H04L 29/06* (2006.01)
  *G06F 21/31* (2013.01)
  *G06F 21/41* (2013.01)

(58) Field of Classification Search
  USPC .................................................. 726/7
  See application file for complete search history.

(56) References Cited

U.S. PATENT DOCUMENTS

| | | | |
|---|---|---|---|
| 3,295,812 A | 1/1967 | Schneider, et al. |
| 3,295,898 A | 1/1967 | Finzel |
| 3,307,412 A | 3/1967 | Granqvist |
| 3,352,730 A | 11/1967 | Murch, Jr. |
| 4,766,293 A | 8/1988 | Boston |
| 5,437,346 A | 8/1995 | Dumont |
| 5,438,186 A | 8/1995 | Nair et al. |
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,422,462 B1 | 7/2002 | Cohen |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,748,367 B1 | 6/2004 | Lee |
| 7,058,806 B2 | 6/2006 | Smeets et al. |
| 7,111,323 B1 | 9/2006 | Bhatia et al. |
| 7,136,835 B1 | 11/2006 | Flitcroft et al. |
| 7,177,838 B1 | 2/2007 | Ling |
| 7,231,202 B2 | 6/2007 | Natsuno |
| 7,239,226 B2 | 7/2007 | Berardi et al. |
| 7,328,189 B2 | 2/2008 | Ling |
| 7,337,144 B1 | 2/2008 | Blinn et al. |
| 7,373,515 B2 | 5/2008 | Owen et al. |
| 7,398,250 B2 | 7/2008 | Blinn et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,596,530 B1 | 9/2009 | Glasberg |
| 7,599,287 B2 | 10/2009 | Testa et al. |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,697,920 B1 | 4/2010 | McClain |
| 7,698,221 B2 | 4/2010 | Blinn et al. |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | Labrou et al. |
| 7,848,980 B2 | 12/2010 | Carlson |
| 7,930,264 B2 | 4/2011 | Geppert |
| 7,988,045 B2 | 8/2011 | Connell, II et al. |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,156,335 B2 | 4/2012 | Lin |
| 8,165,945 B2 | 4/2012 | Collins et al. |
| 8,171,531 B2 | 5/2012 | Buer |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,249,805 B2 | 8/2012 | de Silva et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,332,272 B2 | 12/2012 | Fisher |
| 8,340,981 B1 | 12/2012 | Cave |
| 8,346,666 B2 | 1/2013 | Lindelsee et al. |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,395,242 B2 | 3/2013 | Oliver et al. |
| 8,407,142 B1 | 3/2013 | Griggs |
| 8,412,626 B2 | 4/2013 | Hirson et al. |
| 8,423,466 B2 | 4/2013 | Lanc |
| 8,426,884 B2 | 4/2013 | Mizutani et al. |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,601,602 B1 | 12/2013 | Zheng |
| 8,602,602 B2 | 12/2013 | Anaokar et al. |
| 8,620,790 B2 | 12/2013 | Priebatsch |
| 8,637,133 B2 | 1/2014 | Vagliardo |
| 8,644,506 B2 | 2/2014 | Zellner |
| 8,650,757 B2 | 2/2014 | Rode |
| 8,660,358 B1 | 2/2014 | Bergboer et al. |
| 8,665,991 B2 | 3/2014 | Zhu et al. |
| 8,682,802 B1 | 3/2014 | Kannanari |
| 8,683,571 B2 | 3/2014 | Zapata et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,788,333 B2 | 7/2014 | Alba et al. |
| 8,788,429 B2 | 7/2014 | Tieken |
| 8,789,162 B2 | 7/2014 | Radhakrishnan |
| 8,839,383 B2 | 9/2014 | Van Horn |
| 8,850,575 B1 | 9/2014 | Magi Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 9,055,053 B2 | 6/2015 | Radhakrishnan et al. |
| 9,069,943 B2 | 6/2015 | Radhakrishnan et al. |
| 9,131,443 B2 | 9/2015 | Takaki |
| 9,146,345 B1 | 9/2015 | Dong et al. |
| 9,185,101 B2 | 11/2015 | Grigg et al. |
| 9,185,117 B2 | 11/2015 | Grigg et al. |
| 9,196,188 B2 | 11/2015 | Kimura |
| 9,200,154 B2 | 12/2015 | Teramoto et al. |
| 9,208,301 B2 | 12/2015 | Grigg et al. |
| 9,213,814 B2 | 12/2015 | Grigg et al. |
| 9,213,974 B2 | 12/2015 | Votaw et al. |

(56) References Cited

U.S. PATENT DOCUMENTS

| | | |
|---|---|---|
| 9,223,951 B2 | 12/2015 | Grigg et al. |
| 9,238,674 B2 | 1/2016 | Manoj et al. |
| 9,275,278 B2 | 3/2016 | Liu et al. |
| 9,286,450 B2 | 3/2016 | Grigg et al. |
| 9,305,149 B2 | 4/2016 | Grigg et al. |
| 9,313,190 B2 | 4/2016 | Grigg et al. |
| 9,317,673 B2 | 4/2016 | Grigg et al. |
| 9,317,674 B2 | 4/2016 | Grigg et al. |
| 9,331,994 B2 | 5/2016 | Grigg et al. |
| 9,379,586 B2 | 6/2016 | Rahman et al. |
| 9,390,242 B2 | 7/2016 | Grigg et al. |
| 9,400,005 B2 | 7/2016 | Osborn et al. |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1 | 3/2003 | Uzo |
| 2003/0065805 A1 | 4/2003 | Barnes, Jr. |
| 2003/0105714 A1 | 6/2003 | Alarcon-Luther et al. |
| 2003/0163787 A1 | 8/2003 | Hay et al. |
| 2005/0222961 A1 | 10/2005 | Staib et al. |
| 2006/0030333 A1 | 2/2006 | Ward et al. |
| 2006/0036868 A1 | 2/2006 | Cicchitto |
| 2006/0287004 A1 | 12/2006 | Fuqua |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0277232 A1 | 11/2007 | Cates et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189210 A1 | 8/2008 | Sawhney |
| 2008/0195499 A1 | 8/2008 | Meredith et al. |
| 2008/0293397 A1 | 11/2008 | Gajdos et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0057396 A1 | 3/2009 | Barbour et al. |
| 2009/0076965 A1 | 3/2009 | Elson et al. |
| 2009/0100529 A1 | 4/2009 | Livnat et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0254975 A1 | 10/2009 | Turnbull et al. |
| 2010/0036741 A1 | 2/2010 | Cleven |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0241571 A1 | 9/2010 | McDonald |
| 2010/0257099 A1 | 10/2010 | Bonalle et al. |
| 2010/0268645 A1 | 10/2010 | Martino et al. |
| 2010/0299262 A1 | 11/2010 | Handler |
| 2010/0312636 A1 | 12/2010 | Coulter et al. |
| 2010/0330958 A1 | 12/2010 | Corda et al. |
| 2011/0016534 A1 | 1/2011 | Jakobsson et al. |
| 2011/0022483 A1 | 1/2011 | Hammad |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0218907 A1 | 9/2011 | Dessert et al. |
| 2011/0251892 A1 | 10/2011 | Laracey |
| 2011/0270618 A1 | 11/2011 | Banerjee et al. |
| 2011/0277016 A1 | 11/2011 | Hockings et al. |
| 2011/0294066 A1 | 12/2011 | Hasegawa |
| 2011/0320296 A1 | 12/2011 | Edwards |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0131828 A1 | 5/2012 | August et al. |
| 2012/0137340 A1 | 5/2012 | Jakobsson et al. |
| 2012/0144461 A1 | 6/2012 | Rathbun |
| 2012/0144468 A1 | 6/2012 | Pratt et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0203700 A1 | 8/2012 | Ornce et al. |
| 2012/0230539 A1 | 9/2012 | Calman et al. |
| 2012/0239576 A1 | 9/2012 | Rose et al. |
| 2012/0252365 A1 | 10/2012 | Lam |
| 2012/0254941 A1 | 10/2012 | Levien et al. |
| 2012/0254943 A1 | 10/2012 | Li |
| 2012/0260318 A1 | 10/2012 | Fromentoux et al. |
| 2012/0265585 A1 | 10/2012 | Muirbrook et al. |
| 2012/0271712 A1 | 10/2012 | Katzin et al. |
| 2012/0290482 A1 | 11/2012 | Atef et al. |
| 2012/0300938 A1 | 11/2012 | Kean et al. |
| 2012/0316963 A1 | 12/2012 | Moshfeghi |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0007874 A1 | 1/2013 | Purvis |
| 2013/0009547 A1 | 1/2013 | Shiu et al. |
| 2013/0013498 A1 | 1/2013 | Fisher et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0036048 A1 | 2/2013 | Campos et al. |
| 2013/0042314 A1 | 2/2013 | Kelley |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0110658 A1 | 5/2013 | Lyman et al. |
| 2013/0111208 A1 | 5/2013 | Sabin et al. |
| 2013/0124346 A1 | 5/2013 | Baldwin et al. |
| 2013/0138627 A1 | 5/2013 | Zaydman et al. |
| 2013/0143621 A1 | 6/2013 | Kumaran |
| 2013/0159178 A1 | 6/2013 | Colon et al. |
| 2013/0166332 A1 | 6/2013 | Hammad |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179341 A1 | 7/2013 | Boudreau |
| 2013/0179954 A1 | 7/2013 | Bidare |
| 2013/0188485 A1 | 7/2013 | Midani et al. |

(56) References Cited

U.S. PATENT DOCUMENTS

| | | |
|---|---|---|
| 2013/0191227 A1 | 7/2013 | Pasa et al. |
| 2013/0198056 A1 | 8/2013 | Aldrey et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0219454 A1 | 8/2013 | Hewinson |
| 2013/0219473 A1 | 8/2013 | Schaefer |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0267204 A1 | 10/2013 | Schultz et al. |
| 2013/0268437 A1 | 10/2013 | Desai et al. |
| 2013/0290361 A1 | 10/2013 | Anderson et al. |
| 2013/0304651 A1 | 11/2013 | Smith |
| 2013/0318627 A1 | 11/2013 | Lundkvist et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0129357 A1 | 5/2014 | Goodwin |
| 2014/0130127 A1 | 5/2014 | Toole et al. |
| 2014/0143145 A1 | 5/2014 | Kortina et al. |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poornachandran et al. |
| 2014/0195425 A1 | 7/2014 | Campos et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1* | 6/2015 | Sharma .............. G06Q 20/3224 705/44 |
| 2015/0171049 A1 | 6/2015 | Wasserman et al. |
| 2015/0206131 A1 | 7/2015 | Phillips et al. |
| 2015/0206137 A1 | 7/2015 | Mazarim Fernandes |
| 2015/0213474 A1 | 7/2015 | Howe |
| 2015/0220914 A1 | 8/2015 | Purves et al. |
| 2015/0227903 A1 | 8/2015 | Votaw et al. |
| 2015/0227924 A1 | 8/2015 | Grigg et al. |
| 2015/0227926 A1 | 8/2015 | Grigg et al. |
| 2015/0229625 A1 | 8/2015 | Grigg et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2011.

Zimmerman, Ann. "Check Out the Future of Shopping: Shaving Time Off the Weekly Grocery Run to Keep consumers in Stores and Spending." http://online.wsj.com/article/SB10001424052748703421204576329253050637400.html. 5 pages. Retrieved Mar. 22, 2011.

Office Action dated Aug. 27, 2015 for U.S. Appl. No. 14/175,701.

Lane, "History of APIs"; APIEvangelist.com; Dec. 2012, 11 pages.

Simon, "Credit-Card Reward Programs: A Short History"; Creditcards.com, Nov. 2006, 4 pages.

* cited by examiner

USER AUTHENTICATION BASED ON OTHER APPLICATIONS

CROSS-REFERENCE TO RELATED APPLICATIONS

This application is a continuation of U.S. patent application Ser. No. 14/175,863, filed Feb. 7, 2014 of the same title an issuing as U.S. Pat. No. 9,223,951 on Dec. 29, 2015; the contents of which are hereby incorporated by reference.

FIELD OF THE INVENTION

The invention in general is directed to a system for processing authentication credentials for access to an electronic system.

BACKGROUND

There is a need to authenticate a user based on other applications.

BRIEF SUMMARY OF THE INVENTION

In some embodiments, a system for authenticating a user is provided. The system comprises: a memory; a processor; and a module stored in memory, executable by a processor, and configured to: receive a first request to execute a first action associated with a first application; determine that execution of the first action requires user authentication; request one or more authentication credentials from the user; receive a first authentication credential associated with the first action; validate the first authentication credential, thereby resulting in a successful validation of the received first authentication credential; in response to the successful validation, execute the first action; receive a second request to execute a second action associated with a second application determine that execution of the second action requires user authentication; use the successful validation of the first authentication credential to validate a second authentication credential associated with the second action, wherein the successful validation of the first authentication credential is used as a successful validation of the second authentication credential associated with the second action; and in response to the successful validation of the second authentication credential, execute the second action.

In some embodiments, the first application is associated with at least one of a third party, a social media network, a website, and an overarching operating system.

In some embodiments, the at least one of the one or more authentication credentials, the first authentication credential, and the second authentication credential comprises at least one of a user authentication, a username, a password, a passcode, a personal identification number (PIN), a secret question, a received input, and a biometric indicia.

In some embodiments, receiving the first authentication credential comprises receiving input from a user.

In some embodiments, the second application is associated with a financial institution.

In some embodiments, validating at least one of the first authentication credential and the second authentication credential comprises: comparing at least one of the first authentication credential and the second authentication credential to a plurality of authentication credentials in a database, wherein the plurality of authentication credentials are associated with positive validation; and determining a match between at least one of the first authentication credential and the second authentication credential and at least one authentication credential in the plurality of authentication credentials in the database.

In some embodiments, validating at least one of the first authentication credential and the second authentication credential comprises: comparing at least one of the first authentication credential and the second authentication credential to a plurality of authentication credentials in a database, wherein the plurality of authentication credentials are associated with positive validation; and determining there is no match between at least one of the first authentication credential and the second authentication credential and at least one authentication credential in the plurality of authentication credentials in the database.

In some embodiments, determining there is no match between at least one of the first authentication credential and the second authentication credential and at least one authentication credential in the plurality of authentication credentials in the database comprises restricting execution of the second action.

In some embodiments, determining there is no match between at least one of the first authentication credential and the second authentication credential and at least one authentication credential in the plurality of authentication credentials in the database comprises prompting a user for input of at least one additional authentication credential.

In some embodiments, the second action comprises at least one of a funds transfer, viewing an account summary, a deposit, a withdrawal, and viewing a receipt.

In some embodiments, executing the second action requires validation of the second authentication credential.

In some embodiments, receiving at least one of the first authentication credential and the second authentication credential includes receiving at least one of a hard authentication, a soft authentication, and zero authentication.

In some embodiments, receiving the hard authentication comprises enabling a user to execute all actions associated with at least one of the first application and the second application.

In some embodiments, receiving the soft authentication comprises enabling a user to execute to at least one action associated with at least one of the first application and the second application.

In some embodiments, receiving zero authentication includes denying a user access to at least one action associated with at least one of the first application and the second application.

In some embodiments, receiving zero authentication associated with at least one of the first authentication credential and the second authentication credential comprises: counting a number of failed validation attempts associated with at least one of the first authentication credential and the second authentication credential; comparing the number of failed validation attempts to a predetermined threshold value associated with positive validation; determining that the number of failed validation attempts is greater than the predetermined threshold value associated with positive validation; and initiating the presentation of an interface that prompts the user to input at least one additional authentication credential.

In some embodiments, executing the first action validates the second authentication credential.

In some embodiments, the first application is integrated with the second application.

In some embodiments, a method for authenticating a user is provided. The method comprises: receiving a first request to execute a first action associated with a first application;

determining that execution of the first action requires user authentication; requesting one or more authentication credentials from the user; receiving a first authentication credential associated with the first action; validating the first authentication credential, thereby resulting in a successful validation of the received first authentication credential; in response to the successful validation, executing the first action; receiving a second request to execute a second action associated with a second application; determining that execution of the second action requires user authentication; using the successful validation of the first authentication credential to validate a second authentication credential associated with the second action, wherein the successful validation of the first authentication credential is used as a successful validation of the second authentication credential associated with the second action; and in response to the successful validation of the second authentication credential, executing the second action.

In some embodiments, a computer program product for authenticating a user is provided. The product comprises: a memory; a processor; and a module stored in memory, executable by a processor, and configured to receive a first request to execute a first action associated with a first application; determine that execution of the first action requires user authentication; receive a first request to execute a first action associated with a first application; determine that execution of the first action requires user authentication; request one or more authentication credentials from the user; receive a first authentication credential associated with the first action; validate the first authentication credential, thereby resulting in a successful validation of the received first authentication credential; in response to the successful validation, execute the first action; receive a second request to execute a second action associated with a second application; determine that execution of the second action requires user authentication; use the successful validation of the first authentication credential to validate a second authentication credential associated with the second action, wherein the successful validation of the first authentication credential is used as a successful validation of the second authentication credential associated with the second action; and in response to the successful validation of the second authentication credential, execute the second action.

BRIEF DESCRIPTION OF THE DRAWINGS

Figure 1A:
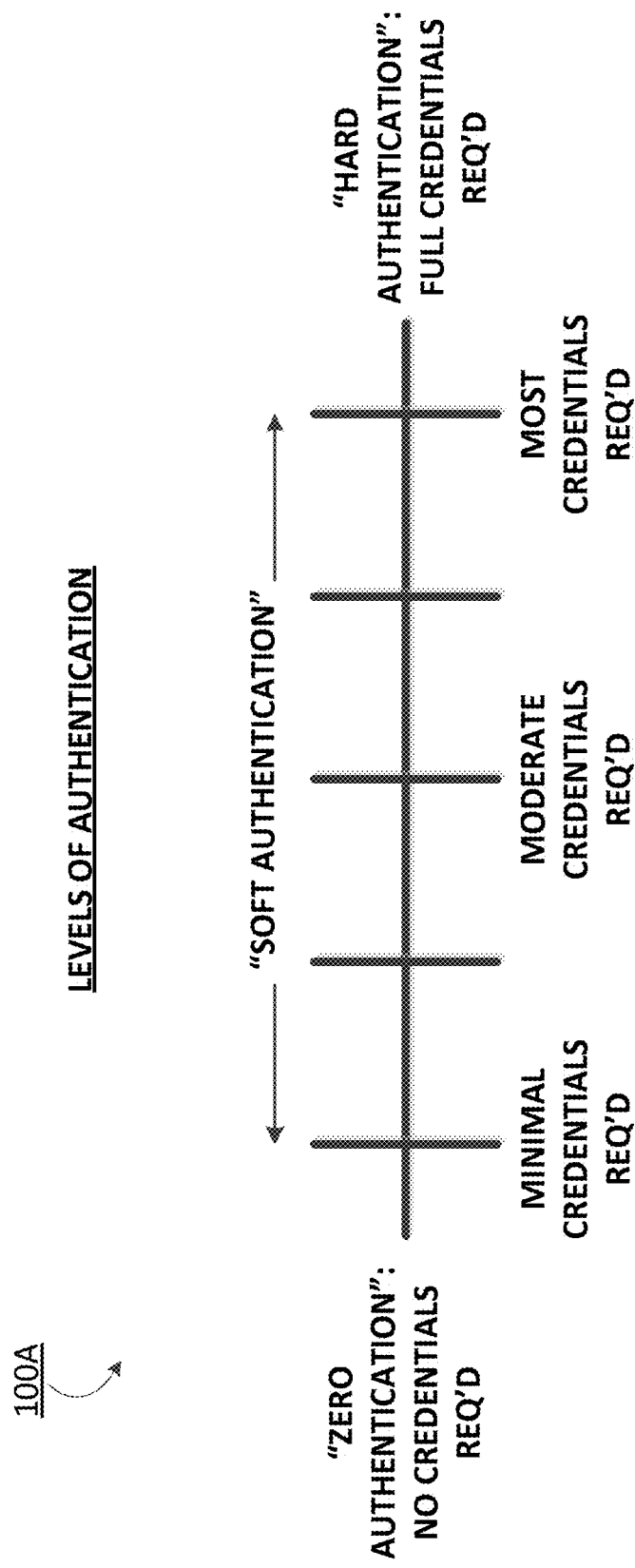
Figure 1B:
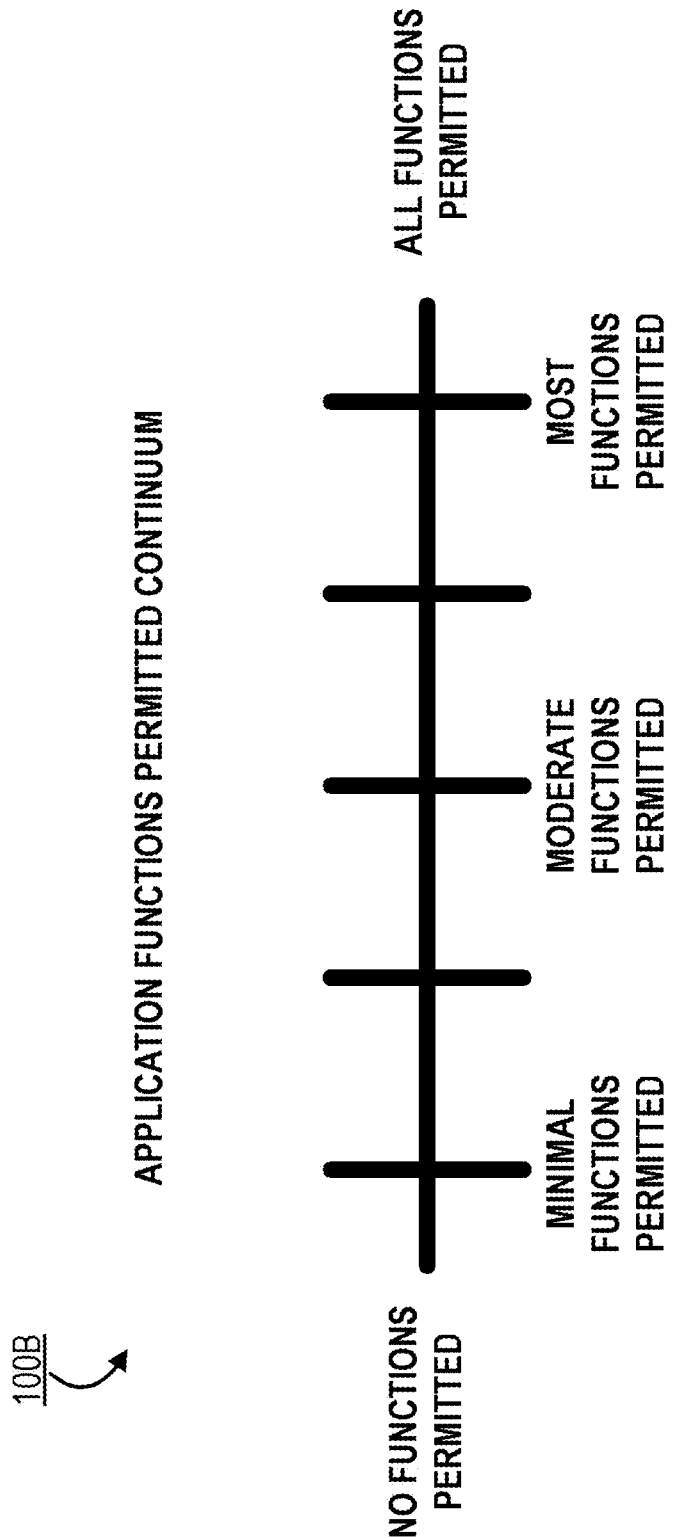
Figure 1C:
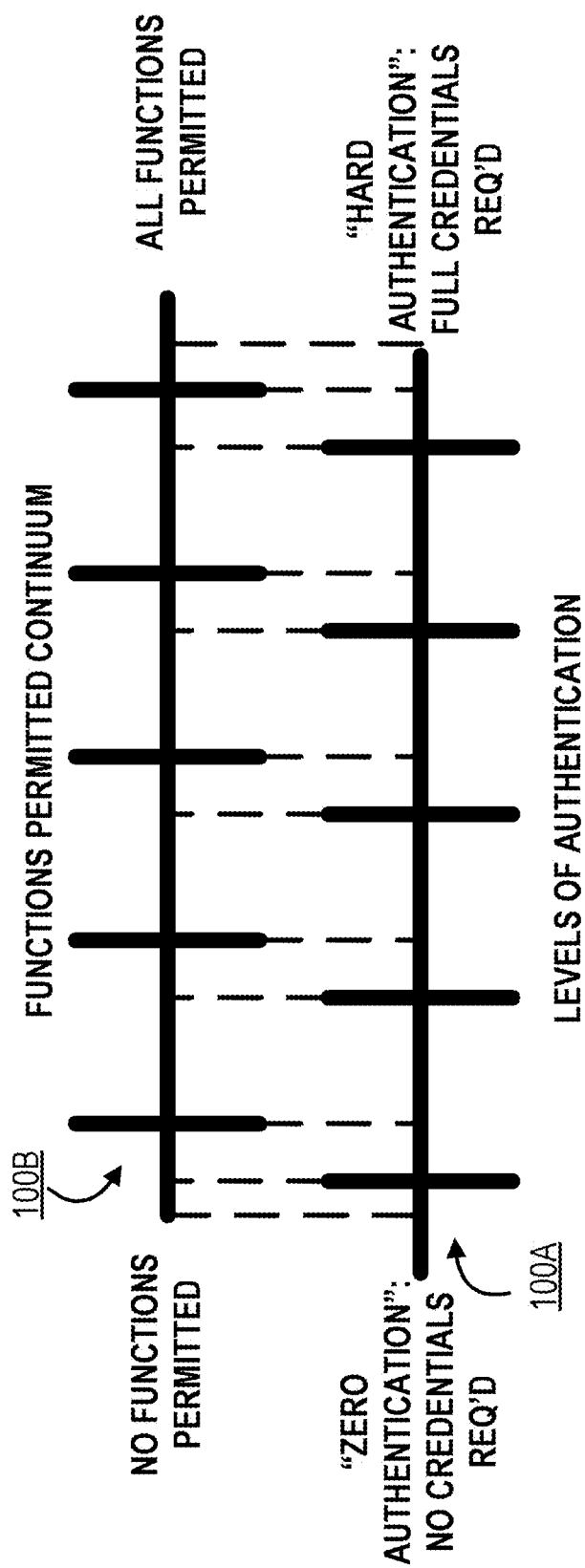
Figure 2:
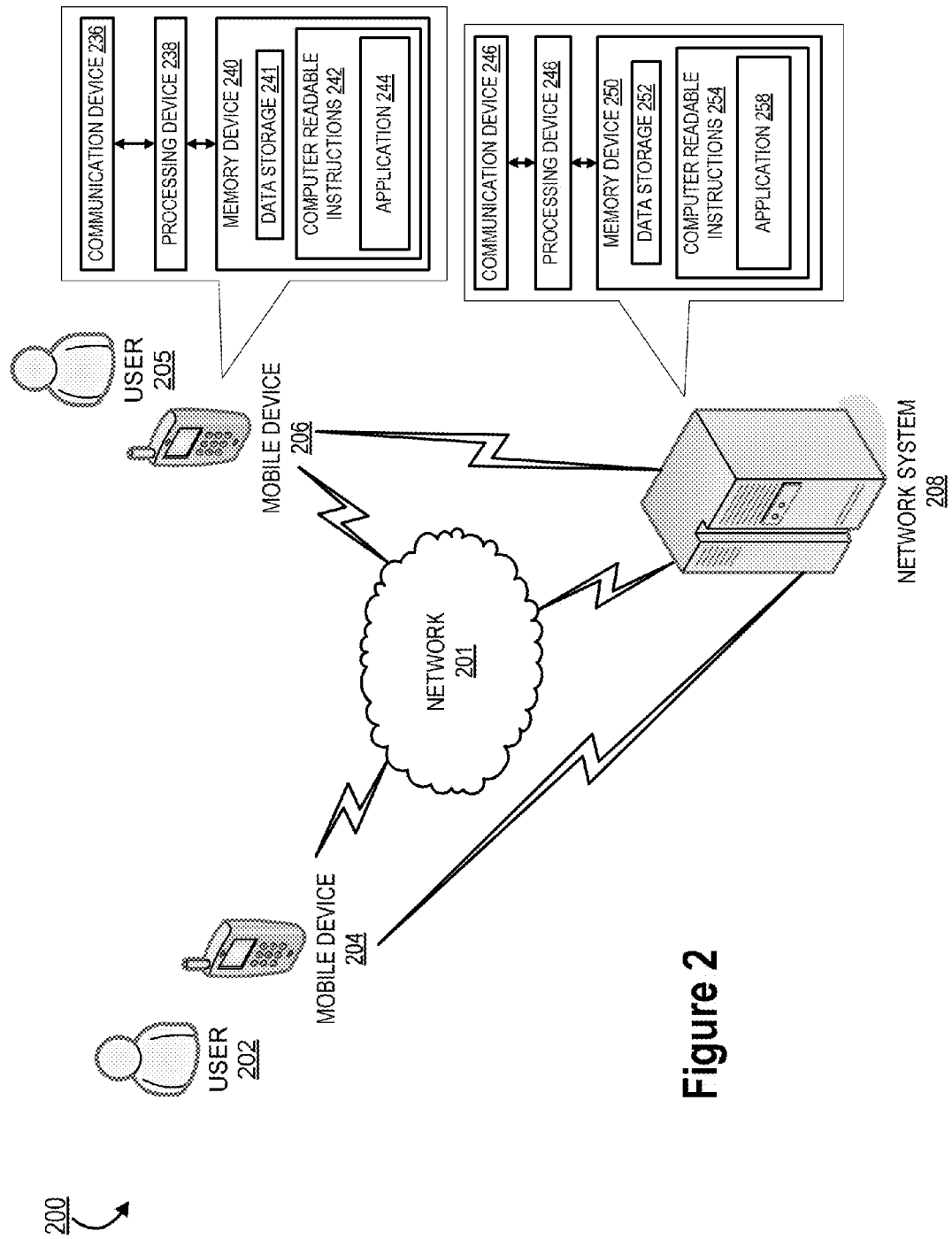
Figure 3:
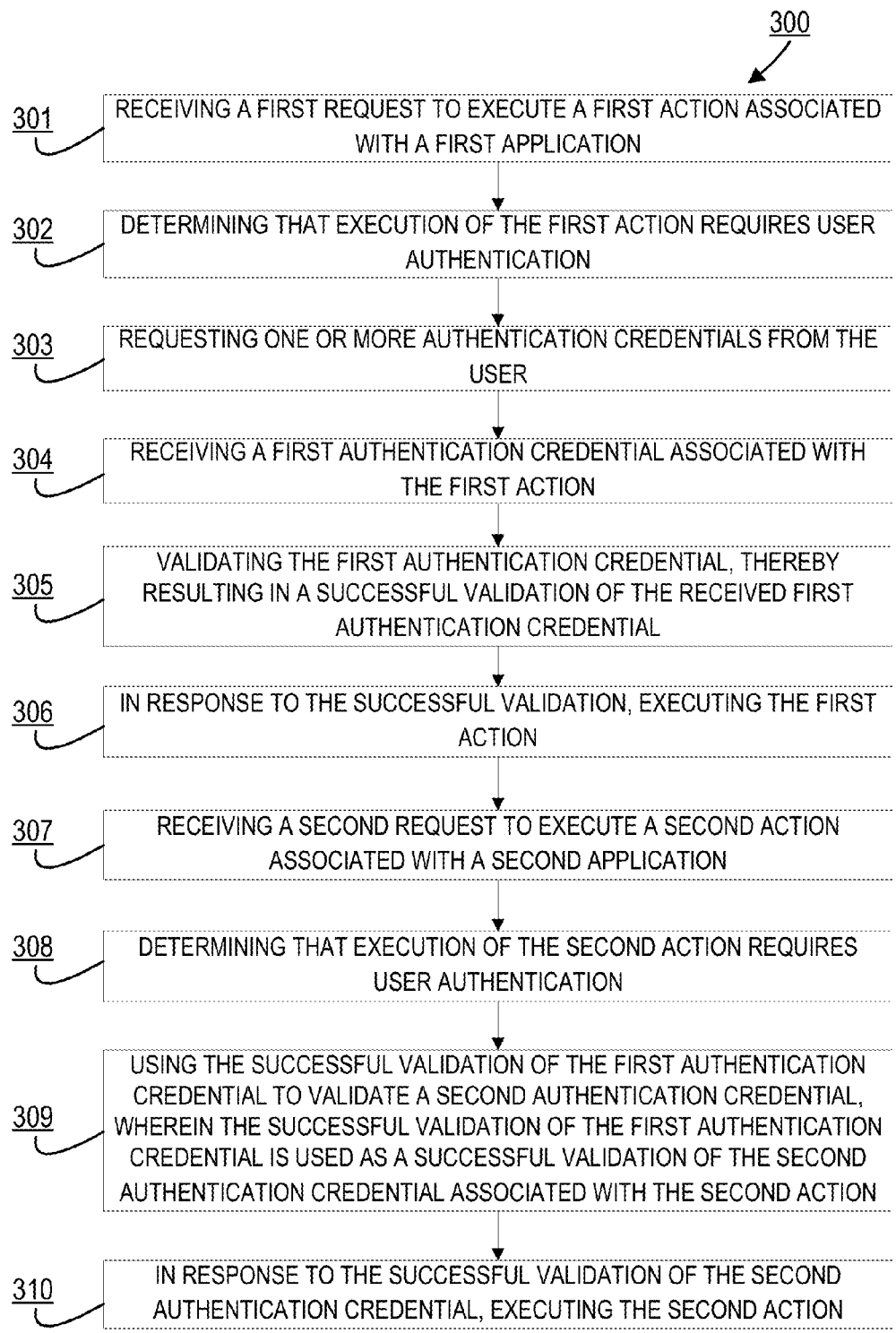

Having thus described embodiments of the invention in general terms, reference will now be made to the accompanying drawings, where:

FIG. 1A is an exemplary illustration of an authentication continuum, in accordance with embodiments of the present invention;

FIG. 1B is an exemplary illustration of an application function permission continuum, in accordance with embodiments of the present invention;

FIG. 1C is an exemplary illustration of the authentication continuum coupled with the application function permission continuum, in accordance with embodiments of the present invention;

FIG. 2 is a block diagram illustrating technical components of a system for authenticating a user based on other applications, in accordance with embodiments of the present invention; and FIG. 3 is a general process flow describing a system for authenticating a user based on other applications, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may not be a financial institution.

In some embodiments, a "user" may be an internal operations specialist, a business development operations specialist, a business unit manager, a project manager, a process owner, or a member quality assurance team associated with the entity.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continua 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 presents a process flow 300 describing a system that manages a framework for control quality verification. At block 301, the process includes receiving a first request to execute a first action associated with a first application. At block 302, the process includes determining that execution of the first action requires user authentication. At block 303, the process includes requesting one or more authentication credentials from the user. At block 304, the process includes receiving a first authentication credential associated with the first action. At block 305, the process includes validating the first authentication credential, thereby resulting in a successful validation of the received first authentication credential. At block 306, the process includes, in response to the successful validation, executing the first action. At block 307, the process includes receiving a second request to execute a second action associated with a second application. At block 308, the process includes determining that execution of the second action requires user authentication. At block 309, the process includes using the successful validation of the first authentication credential to validate a second authentication credential, wherein the successful validation of the first authentication credential is used as a successful validation of the second authentication credential associated with the second action. At block 310, the process includes, in response to the successful validation of the second authentication credential, executing the second action.

In some embodiments, the first application and the second application may be installed, downloaded, opened, operated, or the like on the same device. For example, if the user logs into a social media application on his mobile device, the user may be authenticated to execute a suite of transactions in an online banking application also installed on his mobile device. Therefore, the authentication of the second action based on the first action may occur on the same device. In other embodiments, the first and second applications may be running on different devices. For example, the user may log into a social media application on his mobile device. The user may wish to authenticate a deposit transaction on his desktop computer. Because the first action (the social media login) and the second action (the deposit transaction) occur on different devices, the present invention may not authenticate a request to execute a second action based on successful authentication of the first action due to being on separate devices. However, the present invention may authenticate the second action based on the first action, even if the requests to execute the first and second actions, which require a predetermined level of authentication, occur on separate devices. In still other embodiments, receiving a request to authenticate a second action may be partially authenticated based on the authentication of a first action on another device. The device-specific authentication and/or execution may be configured by the user or a system administrator.

Authentication may be required to execute an action associated with an application. For example, if a user wishes to execute a funds transfer via a mobile banking application, the user may be required to input at least one authentication credential (e.g., a username, a passcode, a password, a personal identification number (PIN), an answer to a security question, or the like) to execute the funds transfer. However, the action may be authenticated without directly requiring user input. As such, the present invention is directed to authenticating a second action associated with a second application based on authentication of a first action associated with a first application.

In some embodiments, the first application may not be associated with the entity and therefore may be associated with a third party (i.e., the first application may be a social media application, a retail shopping application, or another type of application not associated with the entity). In other embodiments, the first application may be associated with the entity. The second application is typically associated with the entity and may be used for executing financial-related transactions or functions. However, the second application also may not be associated with the entity and thus may be associated with a third party. The first application may be integrated with the second application. The second application is typically associated with the entity. Data or metadata associated with the first application or the second application may be transferred between the first application or the second application, or vice versa.

The first action may include user input of an authentication credential, such as a username, a password, a passcode, an answer to a security question, or the like, or user input of information (text, numerical digits, or the like). For example, the first action may be a user authenticating his or her identity in a social media application. Further, the first action may be the act of the user executing a function associated with the first application, such as making a selection or highlighting. The first action may also include simply opening, downloading, possessing, or updating the first application. Additionally, the first action may be associated with a behavior, such as viewing a financial statement, a frequency of a type of transaction, or another habitual function that has been executed in or by the first application. The first action may be associated with an account associated with the first application or a third party (e.g., the user creating, having, or modifying an account or information associated with an account). What is more, the first action may be associated with the execution of an action associated with a device, an operating system native to a device, or an application native to the device. For example, the first action may include the user changing the volume level on a music application native to a mobile device. The first action may also include the transmittal, receipt, processing, analysis, downloading, or deletion of data or metadata associated with the first application, or a third party. For example, the first action may include receiving an automated radio transmission with location information (e.g., GPS coordinates) wherein no user input was received. All in all, the first action may include a wide variety of types of actions or functions associated with the first application, or the device on which the first application runs.

The second action may include a wide variety of types of actions, including but not limited to transferring funds, checking an account balance, making a deposit or withdrawal, or the like. Typically, the second action requires some type of user authentication to ensure that the user attempting to execute the second action is indeed the account holder. The present invention provides the user with a more streamlined approach to providing authentication.

Execution of the first action may correspond to various levels of authorization depending on the type of action that has been executed. Essentially, certain actions may provide certain authorization. For example, the user simply logging in or being logged into the first application may correspond to providing a relatively low level of authentication for the second application and therefore execution of the second action. Conversely, the user executing a transaction (i.e., the first action) in the first application may correspond to a higher level of authentication in the second application. The level of authentication associated with the first action may be assigned a numerical value, which is then processed (i.e., compared to a threshold value of acceptable exposure) to determine if the first action constitutes an acceptable level of authentication in the second application to therefore authenticate the second action. The type of action associated with the first action may be assigned an authentication level that corresponds to a level of authentication on the levels of authentication continuum in FIG. 1A.

The present invention may be configured to receive, collect, analyze, or process information associated with authentication of the first action. For example, the present invention may track the number of login attempts, and which were successful or failed. The present invention may then compare the number of failed login attempts with a predetermined threshold value of acceptable authentication attempts that still warrant positive or "hard" authentication of the second action. Based on this information, the present invention may determine a level of authentication based on the level of authentication continuum or via another method. The determined level of authentication may be used to predict with reasonable probability or predictability that authenticating the first action will indeed provide authentication for the second action, or reject authentication of the second action.

Depending on the type of action of the first action, authentication of the first action may correspond to a level of authentication in the second application, namely for execution of the second action. As explained above, the level of authentication may be zero authentication, soft authentication, and hard authentication, or another level of authentication.

Zero authentication may correspond to rejecting the authentication of the second action in the second application. For example, if there were a high number of failed authorization attempts to execute the first action in the first application, then the corresponding zero authentication level in the second application may restrict execution of the second action. Zero authentication may also correspond to restricting user access to the second application or one or more actions in the second application. Zero authentication may require further authentication in the second application for execution of the second action. For example, the user may be required to manually input a username, a password, or the like to successfully execute or gain access to the second action in the second application. In some embodiments, the additional authentication may be lighter than (i.e., require less authentication or input) the authorization of the first action in the first application. In other embodiments, the additional authentication may be the same as or heavier than (i.e., require more authentication or input) than authorization of the first action in the first application.

Soft authentication may correspond to giving the user at least partial access in the second application. That is, the user may perform certain actions in the second application. In some embodiments, the user may be authorized to execute a second action that corresponds to lower levels of exposure and may be restricted from executing a second action that corresponds to high levels of exposure. For example, a user with soft authentication may be able to view an account summary, but be restricted from executing a funds transfer without further authentication. In short, soft authentication may be considered "read-only" access to the second application and its associated functions. Soft authentication may require further authentication in the second application for execution of the second action. For example, the user may be required to manually input a username, a password, or the like to successfully execute or gain access to a certain second action in the second application. In some embodiments, the additional authentication may be lighter than (i.e., require less authentication or input) the authorization of the first action in the first application. In other embodiments, the additional authentication may be the same as or heavier than (i.e., require more authentication or input) than authorization of the first action in the first application.

Hard authorization may correspond to providing the user with full or total access to all types of functions in the second application, including the second action. For example, because the user successfully is logged in to a social media application and the present invention has made record of a recent post or transaction, the user may be enabled to execute a funds transfer in a mobile banking application (or another action in the second application) without further input or authorization.

In some embodiments, the user may be enabled to add, modify, change, set, or delete settings associated with the levels of authentication. The present invention may be configured by the entity, a third party, or the user.

In some embodiments, the first application and the second application may be installed on the same device (e.g., a mobile device 204 or 206, a computer, a laptop, or the like). In other embodiments, the first application and the second application may be installed on different devices.

The first action and/or the second action may be associated with a period of time, a time of execution of authorization, a probability score, or another metric. These metrics may be used to determine if a request to execute the first action and/or the section action is honest (i.e., stems from the appropriate user or the user associated with the first application and/or the second application). The first action and/or the second action may also be associated with a request for performing the first and/or section action.

In some embodiments, the first or second authentication may be associated with the first or second application. In other embodiments, the first or second authentication may be associated with an operating system native to the user's computing device (e.g., mobile device, laptop, tablet, or the like). For example, if the user unlocks his mobile device via a personal identification number (PIN), a biometric, a password, or the like, this unlocking may constitute a first or second action and therefore grant a first or second authentication. Furthermore, an action executed on the device's operating system such as a swipe, a selection, a zoom, a click, a scroll, or the like may constitute a first or second action and therefore grant a first or second authentication.

As another example, the first application and the second application may be associated with the entity. The first application may be associated with a mobile application, and the second application may be associated with a financial management application associated with a related third party but accessible through the first application. A successful or honest authentication attempt in the first application may provide a predetermined level of authentication (zero, soft, or hard authentication) in the second application. Therefore the present invention may enable the user to easily access multiple related applications (and certain authenticated functions within these related applications) using a first authentication.

Furthermore, the present invention may be configured to track from where the user is coming and therefore provide a predetermined level of authentication based on the user's previous location in the digital space. For example, if the user entered the second application via a link to the second application in the first application, the present invention may recognize that the user entered the second application from the link in the first application. Because the first application and second application are clearly associated with one another and the present invention determines so, the user's selection of the link in the first application may constitute a first action and thus may correspond to a first authentication. Therefore, when the user enters the second application, the user may be enabled with an associated level of authentication in the second application.

The present invention may be configured to operate between two separate devices. For example, the first action may be executed in the first application on a first device. The execution of the first action may provide authentication for the second action associated with the second application on a second device. The first device and the second device may utilize at least one of (or a combination of) a device location, a time of action execution, an IP address, or the like to determine if the execution of the first action provides an honest authorization attempt.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

All in all, one purpose of the present invention is to provide the user with an easier method of operation when using a banking application. By authenticating a financial transaction in a banking application based an action or behavior in another application, the user will not be forced to continually input authentication credentials to execute the financial transaction. Therefore, the user may have faster access to execute important business transactions with greater ease.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/175,639 | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 14/175,643 | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 |
| 14/175,646 | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 |
| 14/175,701 | USER AUTHENTICATION BASED ON HISTORICAL TRANSACTION DATA | Feb. 7, 2014 |
| 14/175,947 | USER AUTHENTICATION BASED ON HISTORICAL USER BEHAVIOR | Feb. 7, 2014 |
| 14/175,954 | USER AUTHENTICATION BY GEO-LOCATION AND PROXIMITY TO USERS CLOSE NETWORK | Feb. 7, 2014 |
| 14/175,615 | USER AUTHENTICATION BASED ON FOB/INDICIA SCAN | Feb. 7, 2014 |
| 14/175,688 | USER AUTHENTICATION BASED ON SELF-SELECTED PREFERENCES | Feb. 7, 2014 |
| 14/175,672 | SELF-SELECTED USER ACCESS BASED ON SPECIFIC | Feb. 7, 2014 |

-continued

| U.S. patent application Ser. No. | Title | Filed On |
|---|---|---|
| | AUTHENTICATION TYPES | |
| 14/175,136 | SHUTTING DOWN ACCESS TO ALL USER ACCOUNTS | Feb. 7, 2014 |
| 14/175,146 | PROVIDING AUTHENTICATION USING PREVIOUSLY-VALIDATED AUTHENTICATION CREDENTIALS | Feb. 7, 2014 |
| 14/175,652 | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 14/175,956 | SORTING MOBILE BANKING FUNCTIONS INTO AUTHENTICATION BUCKETS | Feb. 7, 2014 |
| 14/175,962 | AUTHENTICATION LEVEL OF FUNCTION BUCKET BASED ON CIRCUMSTANCES | Feb. 7, 2014 |
| 14/175,771 | REMOTE REVOCATION OF APPLICATION ACCESS BASED ON LOST OR MISAPPROPRIATED CARD | Feb. 7, 2014 |
| 14/175,786 | REVOCATION OF APPLICATION ACCESS BASED ON NON-CO-LOCATED | Feb. 7, 2014 |

What is claimed is:

1. A system for authenticating a user, the system comprising:
 a memory;
 at least one hardware processor; and
 a module stored in memory comprising computer instruction code executable by the at least one hardware processor, and structured to cause the at least one hardware processor to:
  receive a first request to execute a first action associated with a first application;
  determine that execution of the first action requires user authentication;
  request one or more authentication credentials from the user;
  receive a first authentication credential associated with the first action, wherein the first authentication credential is associated with a zero authentication, a soft authentication, or a hard authentication, wherein receiving the hard authentication comprises enabling the user to execute all actions associated with the first application, wherein receiving the soft authentication comprises enabling the user to execute to at least one action associated with the first application, wherein receiving zero authentication comprises denying the user access to at least one action associated with the first application;
  validate the first authentication credential, thereby resulting in a successful validation of the received first authentication credential;
  in response to the successful validation, execute the first action;
  receive a second request to execute a second action associated with a second application, wherein the second request is associated with the execution of the first action;
  determine that execution of the second action requires user authentication;
  determine a digital footprint of the user based on at least the first action executed by the user, wherein the digital footprint of the user comprises one or more previous actions executed by the user, wherein the one or more actions executed by the user comprises the execution of the first action, wherein the digital footprint is used as a second authentication credential required to access the second application; and
  validate the digital footprint indicating that the first action executed by the user is successfully authenticated;
  in response to the successful validation of the digital footprint, execute the second action.

2. The system of claim 1, wherein the first application is associated with at least one of a third party, a social media network, a website, and an overarching operating system.

3. The system of claim 1, wherein at least one of the one or more authentication credentials, the first authentication credential, and the second authentication credential comprises at least one of a user authentication, a username, a password, a passcode, a personal identification number (PIN), a secret question, a received input, and a biometric indicia.

4. The system of claim 1, wherein receiving the first authentication credential comprises receiving input from a user.

5. The system of claim 1, wherein the second application is associated with a financial institution.

6. The system of claim 1, wherein validating at least one of the first authentication credential and the second authentication credential comprises: comparing at least one of the first authentication credential and the second authentication credential to a plurality of authentication credentials in a database, wherein the plurality of authentication credentials are associated with positive validation; and determining a match between at least one of the first authentication credential and the second authentication credential and at least one authentication credential in the plurality of authentication credentials in the database.

7. The system of claim 1, wherein validating at least one of the first authentication credential and the second authentication credential comprises: comparing at least one of the first authentication credential and the second authentication credential to a plurality of authentication credentials in a database, wherein the plurality of authentication credentials are associated with positive validation; and determining there is no match between at least one of the first authentication credential and the second authentication credential and at least one authentication credential in the plurality of authentication credentials in the database.

8. The system of claim 7, wherein determining there is no match between at least one of the first authentication credential and the second authentication credential and at least one authentication credential in the plurality of authentication credentials in the database comprises restricting execution of the second action.

9. The system of claim 7, wherein determining there is no match between at least one of the first authentication credential and the second authentication credential and at least one authentication credential in the plurality of authentication credentials in the database comprises prompting a user for input of at least one additional authentication credential.

10. The system of claim 1, wherein the second action comprises at least one of a funds transfer, viewing an account summary, a deposit, a withdrawal, and viewing a receipt.

11. The system of claim 10, wherein executing the second action requires validation of the second authentication credential.

12. The system of claim 1, wherein the second application is associated with the first application whereby the second application is accessible using the first application.

13. The system of claim 1, wherein receiving zero authentication associated with at least one of the first authentication credential and the second authentication credential comprises: counting a number of failed validation attempts associated with at least one of the first authentication credential and the second authentication credential; comparing the number of failed validation attempts to a predetermined threshold value associated with positive validation; determining that the number of failed validation attempts is greater than the predetermined threshold value associated with positive validation; and initiating the presentation of an interface that prompts the user to input at least one additional authentication credential.

14. A method for authenticating a user, the method comprising:
receiving a first request to execute a first action associated with a first application;
determining that execution of the first action requires user authentication;
requesting one or more authentication credentials from the user;
receiving a first authentication credential associated with the first action, wherein the first authentication credential is associated with a zero authentication, a soft authentication, or a hard authentication, wherein receiving the hard authentication comprises enabling the user to execute all actions associated with the first application, wherein receiving the soft authentication comprises enabling the user to execute to at least one action associated with the first application, wherein receiving zero authentication comprises denying the user access to at least one action associated with the first application;
validating the first authentication credential, thereby resulting in a successful validation of the received first authentication credential;
in response to the successful validation, executing the first action;
receiving a second request to execute a second action associated with a second application, wherein the second request is associated with the execution of the first action;
determining that execution of the second action requires user authentication;
determining a digital footprint of the user based on at least the first action executed by the user, wherein the digital footprint of the user comprises one or more previous actions executed by the user, wherein the one or more actions executed by the user comprises the execution of the first action, wherein the digital footprint is used as a second authentication credential required to access the second application; and
validating the digital footprint indicating that the first action executed by the user is successfully authenticated using the first authentication credential;
in response to the successful validation of the digital footprint, executing the second action.

15. A computer program product for authenticating a user, the computer program product comprising a non-transitory computer-readable medium comprising code causing a computer to:
receive a first request to execute a first action associated with a first application;
determine that execution of the first action requires user authentication;
request one or more authentication credentials from the user;
receive a first authentication credential associated with the first action, wherein the first authentication credential is associated with a zero authentication, a soft authentication, or a hard authentication, wherein receiving the hard authentication comprises enabling the user to execute all actions associated with the first application, wherein receiving the soft authentication comprises enabling the user to execute to at least one action associated with the first application, wherein receiving zero authentication comprises denying the user access to at least one action associated with the first application;
validate the first authentication credential, thereby resulting in a successful validation of the received first authentication credential;
in response to the successful validation, execute the first action;
receive a second request to execute a second action associated with a second application, wherein the second request is associated with the execution of the first action;
determine that execution of the second action requires user authentication;
determine a digital footprint of the user based on at least the first action executed by the user, wherein the digital footprint of the user comprises one or more previous actions executed by the user, wherein the one or more actions executed by the user comprises the execution of the first action, wherein the digital footprint is used as a second authentication credential required to access the second application; and
validate the digital footprint indicating that the first action executed by the user is successfully authenticated;
in response to the successful validation of the digital footprint, execute the second action.

* * * * *